United States Patent [19]

Metcalf

[11] 4,164,753
[45] Aug. 14, 1979

[54] DUAL PYROELECTRIC VIDICON INFRARED CAMERA

[75] Inventor: Travis W. Metcalf, Lemon Grove, Calif.

[73] Assignee: The United States of America as represented by the Secretary of the Navy, Washington, D.C.

[21] Appl. No.: 922,401

[22] Filed: Jul. 6, 1978

[51] Int. Cl.² .......................... H04N 5/33; H01J 31/49
[52] U.S. Cl. ..................................... 358/113; 250/333; 250/334
[58] Field of Search ................ 358/113; 250/333, 334, 250/345

[56] References Cited

U.S. PATENT DOCUMENTS

| | | | |
|---|---|---|---|
| 3,761,615 | 9/1973 | Wreathall | 358/113 |
| 3,946,232 | 3/1976 | Harmer | 250/333 |
| 4,004,087 | 1/1977 | Ennulat | 358/113 |
| 4,021,847 | 5/1977 | Van Atta | 358/113 |
| 4,031,394 | 6/1977 | Felix | 250/334 |
| 4,040,087 | 8/1977 | Hall | 358/113 |
| 4,069,502 | 1/1978 | Nelson | 358/113 |
| 4,072,863 | 2/1978 | Roundy | 250/334 |
| 4,086,616 | 4/1978 | Catano | 358/113 |
| 4,095,257 | 6/1978 | Back | 358/113 |

Primary Examiner—Howard W. Britton
Attorney, Agent, or Firm—R. S. Sciascia; G. J. Rubens; T. M. Phillips

[57] ABSTRACT

Two pyroelectric vidicons are adapted to alternately receive infrared energy radiated from an object by means of a rotating half circle mirror and fixed mirror arrangement. The alternations of the infrared energy received between the two vidicons are synchronized by means of a synchronization and drive circuit adapted to receive frame sync pulses from the camera circuitry. By this arrangement, information is received by the camera 100% of the time.

7 Claims, 2 Drawing Figures

DUAL PYROELECTRIC VIDICON INFRARED CAMERA

BACKGROUND OF THE INVENTION

At present, the known methods of obtaining an image of a stationary object with a pyroelectric infrared camera system are panning or orbiting and chopping. Panning or orbiting involves moving the camera, or lens, back and forth or in a circular motion. In most applications, a steady image is desired, therefore, image-motion compensation is required. This technique produces smeared images, particularly as the temperature contrast increases, and the additional size and weight of the mechanical apparatus required to pan or orbit the camera is a serious drawback in some applications. In its simplest form, chopping is accomplished by interrupting the beam of energy radiated by the source. This technique, without additional signal processing, produces flicker and the sensitivity is reduced.

A more sophisticated method of chopping referred to as image difference processing, has been developed. In this technique, radiation is chopped in synchronism with the frame, which generates frames having alternating scene polarity. Each frame is stored in memory, the following frame substracted from it, and the resultant signal displayed (after inverting the polarity of alternating frames). This technique improves the signal-to-noise ratio (compared to the normal chopping method) and reduces fixed pattern noise. However, since the scene radiation is received only 50% of the time, the sensitivity is reduced from that which can be obtained by the panning technique.

SUMMARY OF THE INVENTION

The present invention provides for improved sensitivity and signal-to-noise ratio and eliminates the requirement of panning or orbiting in order to obtain an image on a stationary object. Infrared energy received from an object is directed alternately to two pyroelectric vidicons by an optical lens and rotating mirror arrangement. The received energy is allowed to pass directly to a first vidicon for approximately 50% of the time and is directed to a second vidicon for approximately 50% of the time. By means of a synchronizing circuit and switch the live video signal is added directly with the inverted output from the vidicon not receiving energy to provide a higher signal to noise ratio signal output.

Accordingly, an object of the invention is an improved pyroelectric vidicon camera with improved signal-to-noise ratio.

Another object of the invention is to provide an improved pyroelectric vidicon camera by removing flicker and increasing sensitivity.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
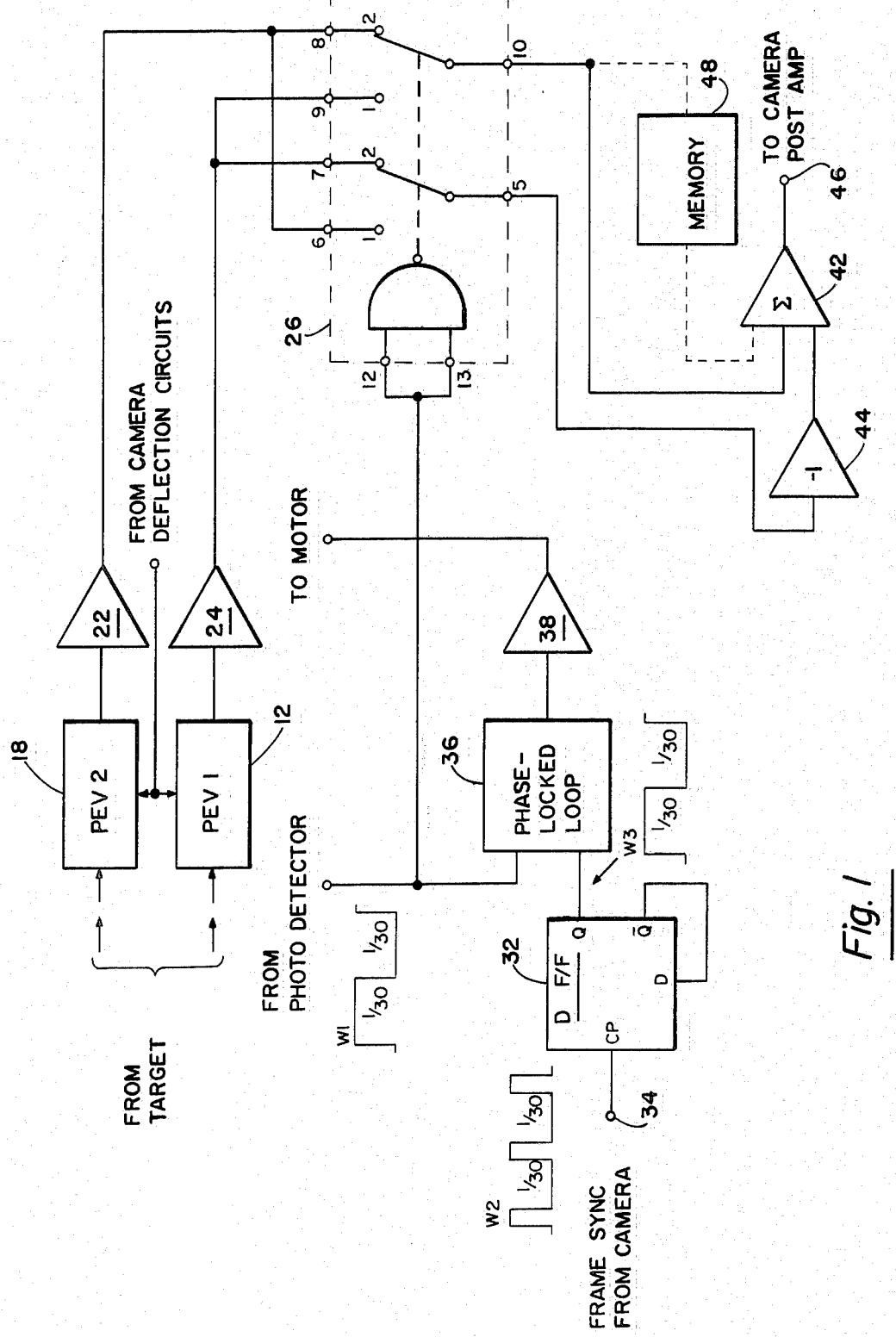
FIG. 1 is a block diagram of the preferred embodiment of the invention.
Figure 2:
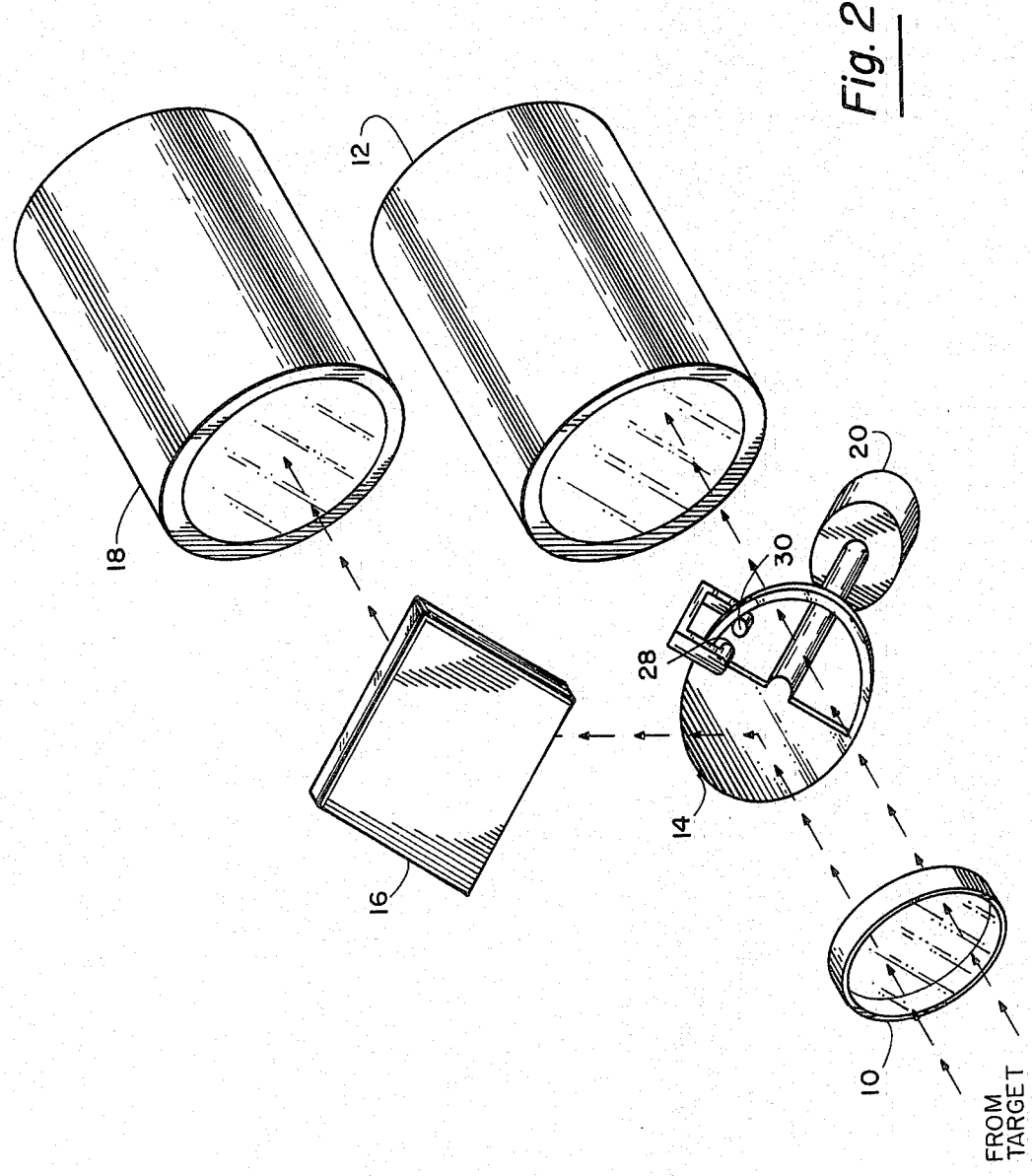
FIG. 2 shows the optical arrangement of embodiment of FIG. 1.

Referring now to FIGS. 1 and 2 wherein there is shown a lens system 10 (FIG. 2) for receiving radiated infrared energy from an object (not shown). The infrared energy passed through lens system 10 is passed directly to a first pyroelectric vidicon 12 and reflected by means of half circle rotating mirror 14 on fixed mirror 16 to a second pyroelectric vidicon 18. This permits the radiated energy from the object to pass through and fall on the target of vidicon 12 half of the time. The other half of the time the radiated energy is deflected to fixed mirror 16 and then to the target of vidicon 18. Rotating mirror 14 is made to rotate in synchronism with the camera synchronous pulses by means of motor 20. The output from vidicons 12 and 18 are fed through pre-amps 24 and 22 (FIG. 1), respectively, to an analog switch 26. The light emitting diode 28 and photo detector 30 (FIG. 2) senses the position of the rotating mirror 14 and causes the analog switch 26 (FIG. 1) to switch at the appropriate time. Switch 26 may be of the field effect transistor type. The output of photo detector (waveform W1) is a square wave with a pulse width equal to the camera frame time. Flip-flop 32 generates a square wave (waveform W3) from the frame signal (waveform W2) at terminal 34 which is received from the camera. The frequency of W3 is ½ the frame rate of W2. Phase locked loop 36 compares the phase of signal W1 with that of W3 and produces an output voltage proportional to the difference in phase.

The analog output of the phase locked loop is buffered and amplified by amplifier 38. The output of amplifier 38 drives motor 20 at the proper speed such that signal W1 is synchronous with the frame sync signal W3. During the frame time vidicon 18 is receiving the thermal energy from the scene, analog switch 26 is in position 2, as shown. The video information from vidicon 18 and pre-amp 22 is positive. The positive signal is passed through switch 26 directly to summing amplifier 42.

The negative video information from vidicon 12 and amplifier 24 (caused by the inversion of the termal image received by vidicon 12 in the previous frame) is passed through switch 26 to inverter 44. After inversion, the video signal from inverter 44 is summed with the video signal from vidicon 18 in summing amplifier 42. The combined video signal is then fed to output terminal 46 to be processed in the normal manner. The summing process of summing amplifier 42 adds the elements of the signal from the two vidicons that are coincident (valid scene information). The elements of the signals from the two vidicons that are not coincident (random noise) are not added and are fed to terminal 46 with unity gain. This has the effect of doubling the signal-to-noise ratio.

In the preferred embodiment pyroelectric vidicons 12 and 18 may be of the S66XQ type manufactured by Amprex. Flip-flop 32 may be a 7474 and phase lock loop 36 may be a LM 565. Analog memory 48 may be of the C. C. D. or disc type.

As an alternate a one-frame storage memory 48 may be added to the circuit. Memory 48 should have the capability of reading out the last frame of video while storing the present frame. By summing the last frame of video (from the memory) with the outputs of the two vidicons the signal-to-noise ratio is further enhanced.

Obviously, many other modifications and variations of the present invention are possible in the light of the above teachings. It is therefore to be understood that within the scope of the appended claims the invention may be practiced otherwise than as specifically described.

What is claimed is:

1. In a dual pyroelectric vidicon infrared camera, the combination comprising:
   (a) first and second pyroelectric vidicons,
   (b) means for receiving and alternately transmitting, infrared energy radiated from an object of interest to the target of said first vidicon and the target of said second vidicon,
   (c) circuit means connected to the output of said first and second vidicons for alternately inverting and summing the outputs of said vidicons,
   (d) whereby the sensitivity and the signal to noise ratio of said infrared camera is increased.

2. The infrared camera of claim 1 wherein said means for receiving and alternately transmitting the radiated infrared energy including a rotating mirror positioned in the optical path of said first vidicon and a second mirror positioned in the optical path of said second vidicon.

3. The infrared camera of claim 2 wherein said circuit means includes switching means connected to said first and second vidicons for always connecting the live video signal directly to a summing means and the previous video image through an inverter to the summing means.

4. The infrared camera of claim 3 wherein said switching means is controlled by a synchronizing circuit.

5. The infrared camera of claim 4 wherein said synchronizing circuit includes a photo detector positioned to detect when said infrared energy is deflected from one vidicon to the other of said vidicons.

6. The infrared camera of claim 5 wherein said switching means responds to the output of said photo detector to switch the live video signal directly to said summing means and the other video signal to said summing means through an inverter.

7. The infrared camera of claim 5 wherein the signal-to-noise ratio of the combined video signal is further enhanced by connecting a one frame storage memory between said switching means and said summing means for summing the last frame of video from the memory with the live video signal and the inverted video signal.

* * * * *